United States Patent [19]
Manning

[11] 3,856,100
[45] Dec. 24, 1974

[54] ENGINE COOLING AND NOISE ABATEMENT SYSTEM

[75] Inventor: Donald L. Manning, Orchard Lake, Mich.

[73] Assignee: General Motors Corporation, Detroit, Mich.

[22] Filed: Oct. 11, 1973

[21] Appl. No.: 405,414

[52] U.S. Cl. .............................. 180/54 A, 180/68 R
[51] Int. Cl. ............................................. B60k 11/08
[58] Field of Search ........................ 180/54 A, 68 R

[56] References Cited
UNITED STATES PATENTS

| | | | |
|---|---|---|---|
| 1,921,588 | 8/1933 | Simmon | 180/54 A |
| 2,204,926 | 6/1940 | Clingerman | 180/54 A |
| 2,435,513 | 2/1948 | Rogers et al. | 180/54 A |
| 2,511,549 | 6/1950 | Simi | 180/54 A |
| 2,527,487 | 10/1950 | Paton | 180/54 A |
| 2,620,636 | 12/1952 | Stanton | 180/54 A |

Primary Examiner—David Schonberg
Assistant Examiner—David M. Mitchell
Attorney, Agent, or Firm—John P. Moran

[57] ABSTRACT

The engine cooling and noise abatement system shown includes an encapsulated engine compartment, with louvered openings formed therein, providing an inlet for air which is drawn through the radiator and around and across the engine by adjacent dual SIROCCO fans whose exhaust outlets are mounted in a wall of the encapsulated compartment.

3 Claims, 4 Drawing Figures

PATENTED DEC 24 1974  3,856,100
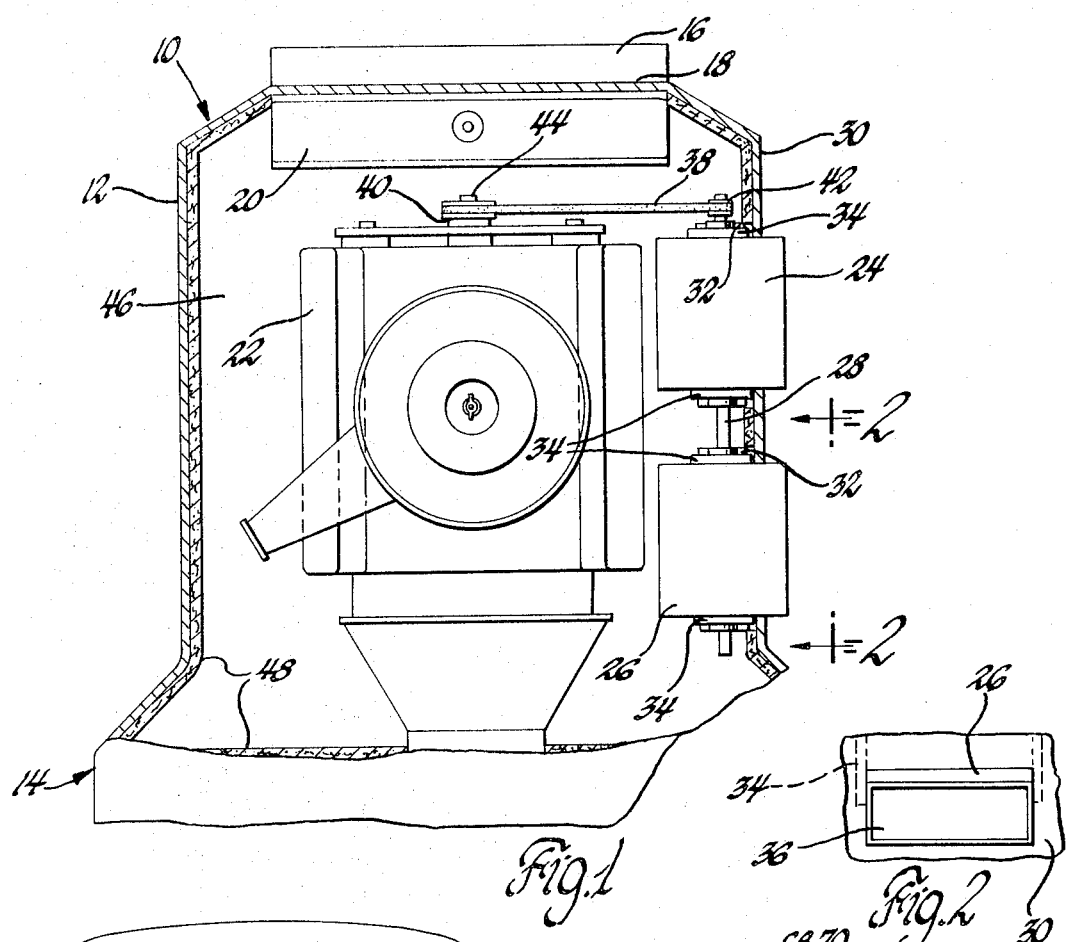
Fig.1
Fig.2
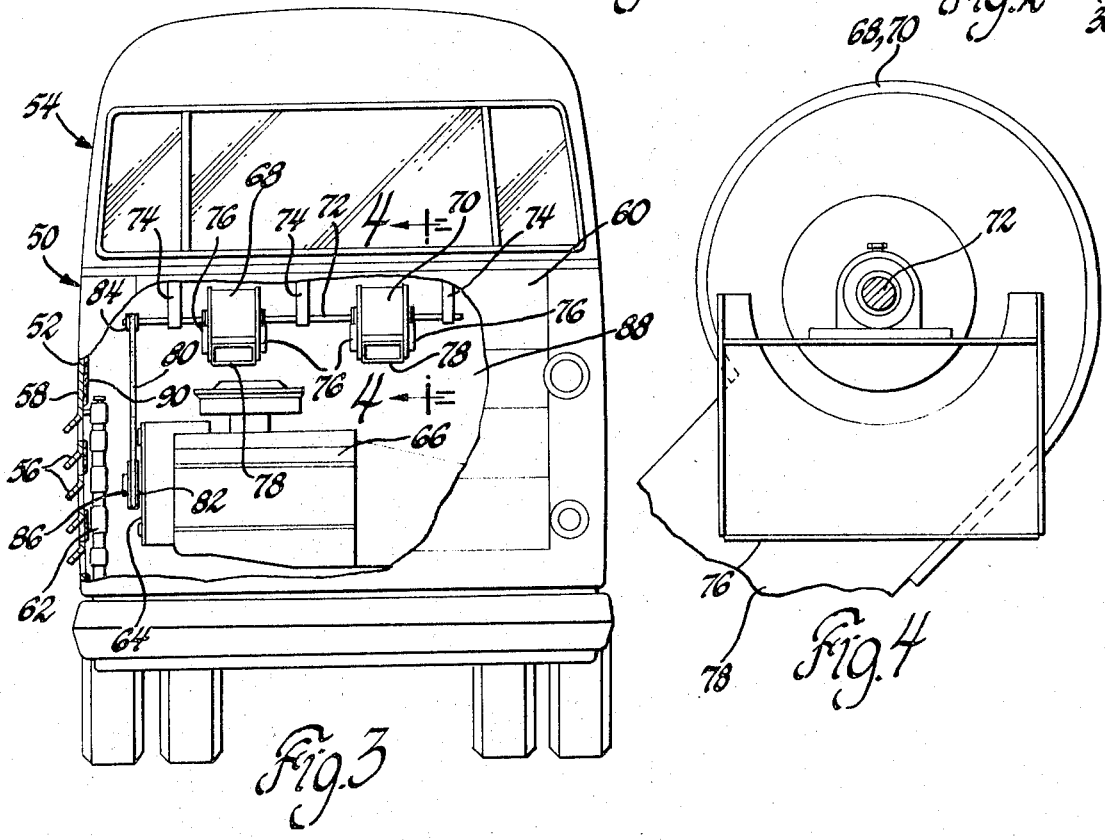
Fig.3
Fig.4

ENGINE COOLING AND NOISE ABATEMENT SYSTEM

This invention relates generally to truck and coach engine cooling systems and, more particularly, to such a system which substantially reduces the usual noise emanating therefrom.

Engines of the gasoline or diesel type have heretofore generally been cooled by virtue of having either a conventional cooling fan or a SIROCCO or squirrel cage-type fan rotatably mounted on the engine between the radiator and the engine. Such fans have generally been shrouded directly to the radiator, with the result that the air drawn through the radiator is directed against the front face of the engine.

It is an object of the present invention to provide an improved cooling arrangement for a gasoline or diesel type engine wherein dual SIROCCO fans are located along a side of the engine which is aligned closely adjacent the radiator, the fans thus positioned serving to draw air through the radiator and across and around the engine, prior to the air entering the suction inlets of the fans and exhausting therefrom to the atmosphere.

Another object of the invention is to provide an in-series arrangement of a radiator, an engine, and dual SIROCCO fan assemblies, wherein the air is drawn through the radiator, circulated around the engine, and exhausted from the fans.

A further object of the invention is to provide an encapsulated engine compartment, with the air inlet thereto being provided by a louvered opening, and with the outlet therefrom being via a SIROCCO fan arrangement mounted so as to exhaust through a wall of the encapsulated compartment directly to the atmosphere.

Another object of the invention is to provide an encapsulated compartment accommodating an in-series arrangement of a louvered opening, a radiator, an engine, and dual SIROCCO fans mounted to exhaust through a wall of the compartment, the effect being to substantially block the so-called "line-of-sight" noise from exiting from the enclosed compartment, thereby reducing noise levels to acceptable standards without suffering any loss in cooling capabilities.

These and other objects and advantages of the invention will be apparent when reference is made to the following description and accompanying drawings, wherein:

FIG. 1 is a cross-sectional view looking down on a forward engine compartment embodying the invention;

FIG. 2 is a fragmentary cross-sectional view taken along the plane of line 2—2 of FIG. 1, and looking in the direction of the arrows;

FIG. 3 is a fragmentary view of an engine compartment embodying the invention and housed in the rear of a coach; and FIG. 4 is an enlarged view of a component of the invention taken along the plane of line 4—4 of FIG. 3, and looking in the direction of the arrows.

Referring now to the drawings in greater detail, FIG. 1 illustrates the incorporation of the inventive engine cooling and noise abatement system 10 within the forward hooded engine compartment 12 of a truck 14. The system 10 includes a plurality of louvers 16 mounted in the center of the front wall 18 of the hooded compartment 12, directly in front of the radiator 20. The engine 22, either gasoline or diesel, is centrally located directly behind the radiator 20.

A pair of axially aligned SIROCCO or squirrel cage-type fan assemblies 24 and 26 are mounted on a common drive shaft 28 on the right or passenger side wall 30 of the engine compartment 12, alongside the engine 22, supported on suitable fixed supports 32. The fans 24 and 26 each include side inlets 34 and an outlet 36 (FIG. 2), and are driven by the engine 22 via a belt 38 mounted on pulleys 40 and 42 secured, respectively, to end portions of the engine crankshaft 44 and the fan drive shaft 28. Exhaust is via the outlets 36, through the side wall 30.

The hooded engine compartment 12 completely encloses a plenum 46, except for the front end inlet through the louvers 16 and the side wall outlets from the SIROCCO fan assemblies 24 and 26. The compartment 12 may include a suitable insulation layer 48 secured to the entire inner surface thereof.

It is the in-series and enclosed arrangement of the radiator 20, the engine 22, and the dual SIROCCO fans 24 and 26 which is considered to be an improvement over the prior art which generally included SIROCCO fans shrouded directly to the radiator, intermediate the radiator and the engine, with hood compartment housing the engine being open adjacent thereto. As an example of this prior art arrangement, see U.S. Pat. No. 2,204,926 Clingerman dated June 18, 1940.

The encapsulated plenum 46 forms a sound barrier around the engine 22, with the air being drawn through the radiator 20, across and around the engine 22, and exhausted out of the SIROCCO fan assemblies 24 and 26, through the side wall 30. By virtue of the louvered inlets to the compartment 12 and the squirrel-caged outlets 36 from the side wall-mounted fans 24 and 26, the so-called "line-of-sight" noise is substantially blocked from exiting from the encapsulated compartment 12, thereby reducing noise levels to acceptable standards, without suffering any loss in cooling capabilities.

Referring now to FIG. 3, the engine cooling and noise abatement system 50 is shown incorporated in an enclosed rear engine compartment 52 of a bus or coach 54. In this embodiment louvers 56 are located in a side wall 58 adjacent the rear wall 60 of the compartment 52. The radiator 62 is located just inside the louvers 56, with the front 64 of the gasoline or diesel engine 66 facing the radiator 62.

A pair of axially aligned sirocco or squirrel cage-type fan assemblies 68 and 70 are mounted on a common drive shaft 72 supported above the engine 66 on suitable support brackets 74. The fans 68 and 70 each include side inlets 76 and an outlet 78, and are driven by the engine 66 via a belt 80 mounted on pulleys 82 and 84 secured, respectively, to end portions of the engine crankshaft 86 and the fan drive shaft 72. Exhaust is via the outlets 78, through the rear wall 60.

As was the case with the forward hooded engine compartment 12, the rear engine compartment 52 completely encloses a plenum 88, except for the inlet through the side wall louvers 56 and the exhaust from the sirocco fan assemblies 68 and 70, through the rear wall 60. The compartment 52 may include a suitable insulation layer 90 secured to the entire inner surface thereof.

Again the in-series and enclosed arrangement of the radiator 62, the engine 66, and the dual sirocco fans 68 and 70 is preserved, with resultant advantages comparable to those indicated above relative to the truck embodiment of FIG. 1.

It should be apparent that the invention provides an in-series and encapsulated engine compartment arrangement of a louvered inlet, a radiator, an engine, and dual sirocco fans which exhaust through a wall of the encapsulated compartment to the atmosphere, providing a means for reducing truck and coach noise levels to acceptable standards, while maintaining highly efficient cooling characteristics.

While but two embodiments of the invention have been shown and described, other modifications thereof are possible.

I claim:

1. An engine cooling and noise abatement system adapted for use in a truck or coach, said system comprising an encapsulated compartment except for a first opening formed in a first wall of said compartment, and second and third openings formed in a second wall of said compartment, a plurality of louvers mounted in said first opening, a radiator mounted in said compartment immediately adjacent said first opening, an engine mounted in said compartment so as to have the end of its crankshaft positioned adjacent said radiator, a shaft rotatably mounted in said compartment adjacent a side of said engine, a pair of squirrel cage fans mounted on said rotatably mounted shaft, a first pulley secured to said crankshaft, a second pulley secured to said rotatably mounted shaft, and an endless belt mounted around said first and second pulleys, said pair of squirrel cage fans having their respective outlets mounted in said second and third openings in said encapsulated compartment to thereby exhaust to the atmosphere.

2. An engine cooling and noise abatement system adapted for use in the truck, said system comprising a front end-mounted encapsulated compartment except for a first opening formed in the forward wall of said compartment, and second and third openings formed in a side wall of said compartment, a plurality of louvers mounted in said first opening, a radiator mounted in said compartment immediately adjacent said first opening, an engine mounted in said compartment so as to have the end of its crankshaft positioned adjacent said radiator, a shaft rotatably mounted in said compartment adjacent said side wall, a pair of squirrel cage fans mounted on said rotatably mounted shaft, a first pulley secured to said crankshaft, a second pulley secured to said rotatably mounted shaft, and an endless belt mounted around said first and second pulleys, said pair of squirrel cage fans having their respective outlets mounted in said second and third openings in said side wall to thereby exhaust to the atmosphere.

3. An engine cooling and noise abatement system adapted for use in a coach, said system comprising a rear end-mounted encapsulated compartment except for a first opening formed in a side wall of said compartment, and second and third openings formed in the rear wall of said compartment, a plurality of louvers mounted in said first opening, a radiator mounted in said compartment immediately adjacent said first opening, an engine mounted in said compartment so as to have the end of its crankshaft positioned adjacent said radiator, a shaft rotatably mounted in said compartment adjacent said rear wall, a pair of squirrel cage fans mounted on said rotatably mounted shaft, a first pulley secured to said crankshaft, a second pulley secured to said rotatably mounted shaft, and an endless belt mounted around said first and second pulleys, said pair of squirrel cage fans having their respective outlets mounted in said second and third openings in said rear wall to thereby exhaust to the atmosphere.

* * * * *